FLUID VORTEX OSCILLATOR

Filed July 6, 1964

INVENTOR,

R. RICHARD PALMISANO

BY: Harry M. Saragovitz, Edward J. Kelly, Herbert Berl & J. P. Edgerton

United States Patent Office 3,311,120

Patented Mar. 28, 1967

3,311,120
FLUID VORTEX OSCILLATOR

Rocco Richard Palmisano, Bethesda, Md., assignor to the United States of America as represented by the Secretary of the Army Filed July 6, 1964, Ser. No. 380,717
4 Claims. (Cl. 137—1)

The invention described herein may be manufactured and used by or for the Government of the United States of America for governmental purposes without the payment to me of any royalty thereon.

This invention relates generally to fluid signal generators, and more particularly to a pure fluid vortex oscillator having no moving parts.

In the field of pure fluid systems, it has been the practice to employ a pure fluid amplifier having feedback passages to form a pure fluid oscillator. Briefly, the general construction of these devices is characterized by providing a bistable fluid amplifier with a feedback passage connecting the right output passage with the right control passage and a feedback passage connecting the left output passage with the left control passage. In operation, a portion of the flow existing in one or the other of the two output passages is diverted to the corresponding control passage. The control fluid flow interacts with and causes the power stream to switch to the other output. The sequence of events repeats resulting in the oscillation of the power stream between the two output passages. The frequency of the oscillation of these devices depends upon the length or the capacitance of the feedback passages. These devices are analogous to the well-known astable multivibrator circuit in electronic timing and signal generation circuits. Although such devices have served the purpose, they have not proven entirely satisfactory for several reasons. Construction of these devices is expensive and somewhat complex due to the accurate milling operations involved. The prior art pure fluid oscillators are inherently inefficient since the fluid flow in only one of the output passages is utilized, the fluid flow in the other output passage being exhausted to the atmosphere or an ambient pressure volume. In addition, these devices cannot be loaded significantly since back pressure to the fluid flow has a considerable effect on the frequency and period of oscillation. As a matter of fact, a small back pressure will cause these devices to cease oscillating. Furthermore, the output fluid signals of the prior art oscillators are quite noisy even under the most favorable operating conditions, and amplitudes of the output fluid signals are small requiring considerable amplification to produce a useful signal. In many applications it is desirable to tune the frequency of the oscillator which is not easily accomplished by the prior art devices.

It is therefore an object of this invention to provide a pure fluid oscillator in which the volume of the utilized output fluid flow averaged over a period of time is substantially equal to the volume of the input fluid flow, thereby providing a highly efficient oscillator.

It is another object of the present invention to provide a pure fluid oscillator which will operate stably under a significant load and provide an output fluid signal which is substantially noise free.

It is a further object of the invention to provide a pure fluid oscillator which produces a large amplitude output signal thereby eliminating the need for amplification of the signal.

It is yet another object of the instant invention to provide a pure fluid oscillator which is simple and inexpensive to manufacture and which may be easily tuned in frequency.

According to the present invention, the foregoing and other objects are attained by providing two cylindrical chambers axially connected by a length of straight tubing. Oscillation is achieved by establishing a vortical flow in one chamber and a counter vortical flow in the other chamber. The output signal flow is taken from an axial port in one of the chambers.

The specific nature of the invention, as well as other objects, aspects, uses and advantages thereof, will clearly appear from the following description and from the accompanying drawings in which.

Figure 1:
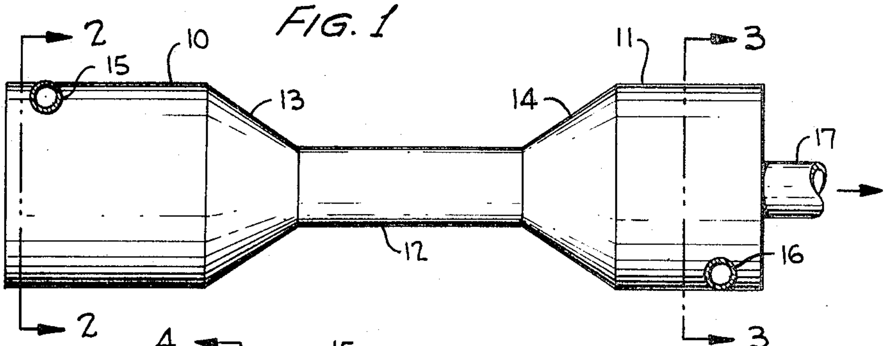
FIG. 1 is a side view of the fluid vortex oscillator.

Referring now to the drawings wherein like reference numerals designate identical parts throughout the several views, and more particularly to FIG. 1 wherein the fluid vortex oscillator is shown as comprising two sections 10 and 11 having hollow cylindrical chambers therein which are axially connected by a length of straight tubing 12. The sections 10 and 11 are provided with flarings 13 and 14, respectively, which have the shapes of hollow truncated conical surfaces to provide smooth junctions between the chambers and the connecting tubing. A tube 15 provides an input passage for fluid into the chamber in section 10 and is positioned to induce a vortical flow within the chamber. Another tube 16 provides an input passage for fluid into the chamber in section 11 and is positioned to induce a counter vortical flow within the chamber. A single output passage for the oscillator is provided by tube 17 which communicates with the chamber in section 11 and the axis of which coincides with the axis of the oscillator. The actual construction of the oscillator may be accomplished simply by drilling a cylindrical hole that smoothly constricts to a smaller diameter concentric bore in each of two blocks of brass, plastic, or other suitable material. This may be a one-step operation using a special bit designed for the operation, or it may be a three-step operation using available bits. The small bores of the two blocks are joined by a piece of tubing which may be press-fit or threaded into the bores. The cylindrical holes are sealed by a flat plate to form the chambers. Each block is drilled to provide a passage which opens tangentially into the cylindrical hole for the input fluid flow, and one sealing plate is drilled to provide a port for the output fluid flow.

Figure 2:
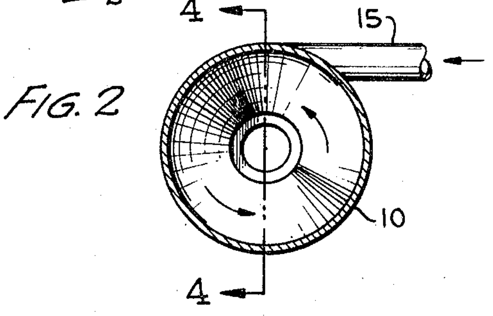
FIG. 2 is a cross-sectional view of the oscillator taken along the section line 2—2 in FIG. 1.

FIG. 2 is a cross-sectional view taken along the section line 2—2 in FIG. 1 and shows the chamber within section 10. The tube 15 introduces a fluid flow tangentially to the inner surface of the chamber. The resulting fluid flow represented by the solid arrow within the chamber is a vortex and has, as represented in this example, a counter-clockwise rotation.

Figure 3:
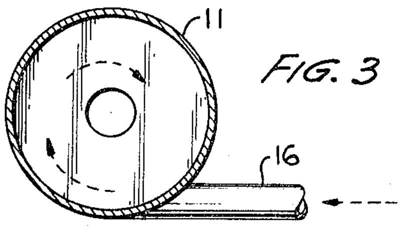
FIG. 3 is a cross-sectional view of the oscillator taken along the section line 3—3 in FIG. 1.

FIG. 3 is a cross-sectional view taken along the section line 3—3 in FIG. 1 and shows the chamber within section 11. The tube 16 introduces a fluid flow under a smaller pressure than flow in tube 15 tangentially to the inner surface of the chamber. The resulting fluid flow represented by the broken arrow within the chamber is a counter vortex of lesser strength having a clockwise rotation.

Figure 4:
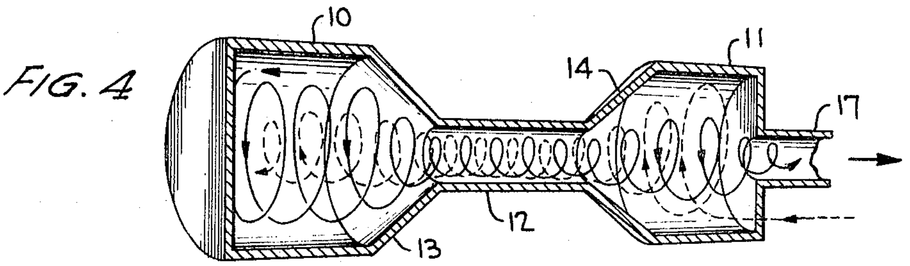
FIG. 4 is a cut-away view of the oscillator taken along the section line 4—4 in FIG. 2 and shows the theoretical fluid flow in the oscillator.

The theoretical fluid flow along the axis of the oscillator is shown in FIG. 4 which is a cut-away view taken along the line 4—4 in FIG. 2. The solid line within the oscillator represents the counter-clockwise vortical flow shown in FIG. 2 by the solid arrow, while the broken line represents the clockwise vortical flow shown in FIG. 3 by the broken arrow. This latter flow ultimately combines with the former flow to produce the output flow in tube 17. The exact interaction of the two vortical flows is not yet fully understood, and any attempt to describe the oscillator mathematically is at best approximate and complicated. The observed operation of the oscillator, however, provides the basis of a functional analysis. The tangential fluid flow introduced in section 10 by tube 15 creates a vortex the strength of which remains nearly constant as the vortex enters into the flaring 13. As the diameter of the vortex decreases, the tangential velocity increases resulting in a rapid pressure drop. Within the tube 12 the energy loss is basically due to viscous and turbulent energy dissipation, and the rate of decrease of pressure is nearly uniform. In section 11 the vortex rotates in a direction opposite to that in section 10. The velocity distribution in the radial direction is such that the velocity decreases with increasing radial distance. At a radial distance approximately equal to the radius of the tube 12, the velocity of the vortex in section 10 may be smaller or larger than that produced by the vortex in section 11 at the same radius. When the two velocities are nearly equal, the rotation at the core of the vortex in section 11 tends to become unstable and changes its direction of rotation with regular frequency. Under those conditions the core behaves like a rotating, oscillatory, solid mass similar to the balance wheel in a clock mechanism. This phenomenon pertains even when the fluid is a gas.

Figure 5:
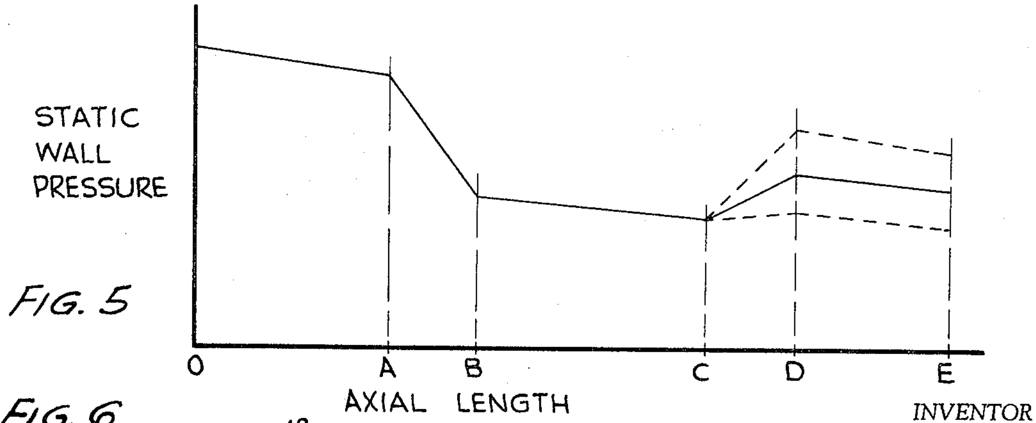
FIG. 5 is a graph of the static wall pressure along the axial length of the oscillator.
Figure 6:
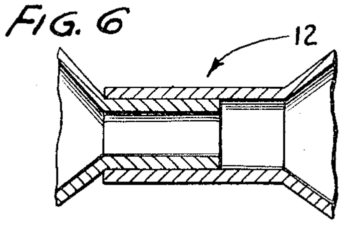
FIG. 6 is a cross-sectional view of a possible construction of tube 12.

The flow just described is graphically depicted in FIG. 5. Here, the static wall pressure is plotted against the axial length of the oscillator. The distance O–A along the abscissa corresponds to section 10; A–B, to the flaring 13; B–C, to tube 12; C–D, to the flaring 14; and D–E, to section 11. The dotted lines on either side of the pressure curve along C–E represent the pressure oscillations. The amplitude of the pressure oscillations increases with decreasing lengths of tube 12 while the inverse is true for the frequency of the oscillations. Pressure oscillation amplitudes of 20 p.s.i. have been measured in a pneumatic model. Loads have a negligible effect on the operation, and the resulting output is almost a pure sinusoidal wave. Obviously, the frequency dependence on the length of the connecting tube provides the basis for a tuneable oscillator. The tube 12 may be made to have a slide fitting like a trombone, or any other well-known expedient for lengthening or shortening a tube may be used to accomplish the desired result.

It will be apparent that the embodiment shown is only exemplary and that various modifications can be made in construction and arrangement within the scope of the invention as defined in the appended claims.

I claim as my invention:

1. A pure fluid vortex oscillator having a substantially noise-free and stable fluid output signal comprising:

(a) means for generating a first vortex having a first sense of rotation, (b) means for separately generating a second vortex in close proximity to said first vortex, said second vortex having a second sense of rotation different from that of said first vortex and having an axis coinciding with the axis of said first vortex, and (c) means connected to said first and second vortex generating means to mix said first and said second vortex to produce a fluid output.

2. A pure fluid vortex oscillator having a substantially noise-free and stable fluid output signal comprising:

(a) a first cylindrical chamber, (b) a second cylindrical chamber having an axis coinciding with the axis of said first cylindrical chamber and having an axial output port, (c) means axially interconnecting said first and said second cylindrical chambers for permitting free fluid flow therebetween, (d) means for introducing a first fluid flow tangentially to the inner surface of said first cylindrical chamber to generate a first vortex having a first sense of rotation, and (e) means for introducing a second fluid flow tangentially to the inner surface of said second cylindrical chamber to generate a second vortex having a second sense of rotation different from said first sense of rotation.

3. A pure fluid vortex oscillator as defined in claim 2 wherein the length of said means axially interconnecting said first and said second cylindrical chambers is variable to permit changing the frequency of the fluid oscillations.

4. The method of producing stable and noise-free fluid oscillations comprising the steps of:

(a) generating a first fluid vortex having a first sense of rotation, (b) generating a second fluid vortex in close proximity to said first vortex, said second fluid vortex having a second sense of rotation different from said first sense of rotation and having an axis coinciding with the axis of said first fluid vortex, and (c) mixing the fluid of said first vortex and said second vortex to produce a fluid output.

References Cited by the Examiner

UNITED STATES PATENTS

| | | | |
|---|---|---|---|
| 3,075,227 | 1/1963 | Bowles | 137—81.5 |
| 3,208,462 | 9/1965 | Fox | 137—81.5 |
| 3,216,439 | 11/1965 | Manion | 137—81.5 |

FOREIGN PATENTS

| | | |
|---|---|---|
| 1,318,907 | 1/1963 | France. |

OTHER REFERENCES

Sarpkaya, Turgut: Characteristics of Counter-Vortex Oscillators; in proceedings of the Fluid Amplification Symposium, 1964, volume II, pp. 147–162, May 1964; Harry Diamond Laboratories, Army Materiel Command, Washington, D.C.

M. CARY NELSON, *Primary Examiner.*

W. R. CLINE, *Assistant Examiner.*